(12) United States Patent  
Chen

(10) Patent No.: US 6,896,438 B1  
(45) Date of Patent: May 24, 2005

(54) TUBE RETAINER

(76) Inventor: Chao-Hu Chen, 235 Chung-Ho Box 8-24, Taipei (TW)

( * ) Notice: Subject to any disclaimer, the term of this patent is extended or adjusted under 35 U.S.C. 154(b) by 0 days.

(21) Appl. No.: 10/746,690

(22) Filed: Dec. 29, 2003

(51) Int. Cl.[7] .............................................. F16B 2/00
(52) U.S. Cl. .................... 403/290; 403/373; 403/374.3
(58) Field of Search ................................ 403/290, 289, 403/373, 374.3, 366, 367, 374.1, 374.2

(56) References Cited

U.S. PATENT DOCUMENTS

| 6,074,123 A | * | 6/2000 | Osborne | ....................... 403/373 |
| 6,413,006 B1 | * | 7/2002 | Neugart | ....................... 403/344 |
| 6,604,887 B2 | * | 8/2003 | Carreira | ....................... 403/373 |

* cited by examiner

Primary Examiner—John R. Cottingham

(57) ABSTRACT

A tube retainer comprises a tube body; a center of the tube body being formed with a receiving space; the receiving space being formed by a large cambered surface and a small cambered surface; one end of the tube body being formed with a tightening portion; the tightening portion being formed with a slot communicated with the receiving space and the outside of the tube body; a hole being formed in the tube body and the hole passing through the slot; a pad having a cambered surface which has the same radian as that of the receiving space; a protrusion protruding from the outer cambered surface; the protrusion having a through hole for retaining the screw fastener. The receiving space has a large cambered surface and a small cambered surface. A threaded hole is formed in the tightening portion and at one side of the through the slot and a via hole is formed in the tightening portion and at another side of the slot. The small cambered surface is at the tightening portion and is adhered to the pad.

4 Claims, 4 Drawing Sheets

TUBE RETAINER

FIELD OF THE INVENTION

The present invention relates to tube retainers, and particular to a tube retainer having an uniform inner space so that stress can be uniformly distributed in the whole inner space and thus no deformation occurs.

BACKGROUND OF THE INVENTION

In one prior art of tube retainers, see FIGS. 7 and 8, a shaft is inserted into a sleeve. An outer edge of the sleeve is enclosed by a tube retainer for fixing the shaft in the sleeve. The feature of this prior art is that a buckle is inserted into a hole of the tube retainer. The tube retainer is enclosed in section of the sleeve having a smaller diameter than other portion of the sleeve. Thereby, the shaft can be tightened without sliding down.

Although this structure has the function of tightening a tube, but the tube retainer will over-lock the tube. After being used for a longer time, the stress will concentrate on a tightening portion so that the portion fatigues, as a result the tube deforms, as shown in the FIGS. 7 and 8. FIG. 8 shows the deformation of a receiving space in the tube retainer.

In another prior art, a tube retainer for using in a larger tube is disclosed. The tube retainer includes a sleeve with a tightening ring therein. The tightening ring is engaged within the sleeve and then a tube is tightly enclosed by the tightening ring. The sleeve and the tightening ring are formed with respective openings. Two ends of the opening of the sleeve are formed with respective protrusions protruding outwards. Thereby, studs and nuts can be used to lock the sleeve by passing the stud through the screw holes in the protrusion. However, this structure still concentrate the stress in the openings of the sleeve and the tightening rings. Thus, the defects in the prior art still exist.

Thereby, the prior arts cannot make the stress to distributed uniformly. This is because the space for clamping a tube is not a complete and uniform cycle.

SUMMARY OF THE INVENTION

Accordingly, the primary object of the present invention is to provide a tube retainer which comprises a tube body; a center of the tube body being formed with a receiving space; the receiving space being formed by a large cambered surface and a small cambered surface; one end of the tube body being formed with a tightening portion; the tightening portion being formed with a slot communicated with the receiving space and the outside of the tube body; a hole being formed in the tube body and the hole passing through the slot; a pad having a cambered surface which has the same radian as that of the receiving space; a protrusion protruding from the outer cambered surface; the protrusion having a through hole for retaining the screw fastener.

Moreover, in the present invention, the receiving space has a large cambered surface and a small cambered surface. A threaded hole is formed in the tightening portion and at one side of the slot and a via hole is formed in the tightening portion and at another side of the slot. The small cambered surface is at the tightening portion and is adhered to the pad.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
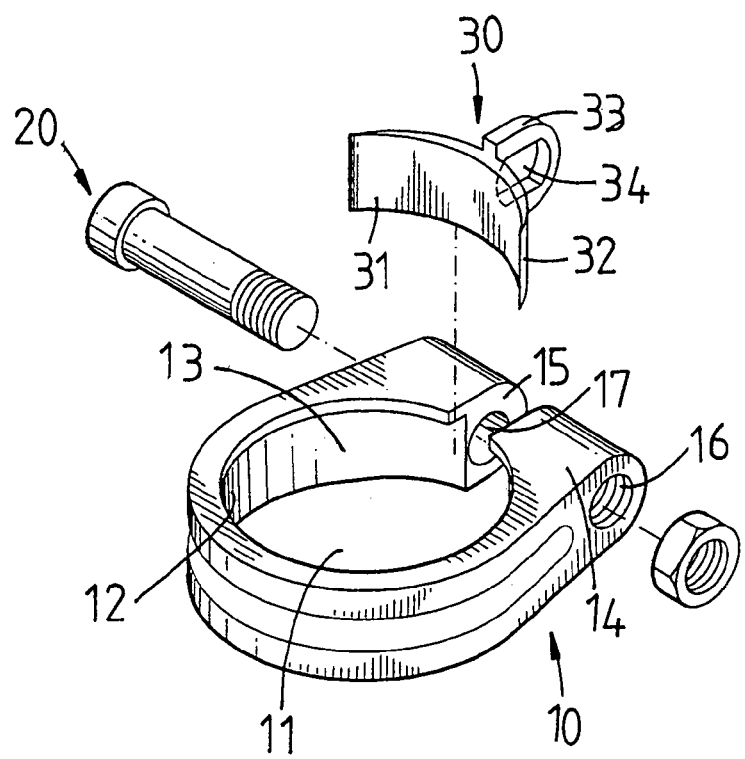
FIG. 1 is an exploded perspective view of the tube retainer of the present invention.
Figure 2:
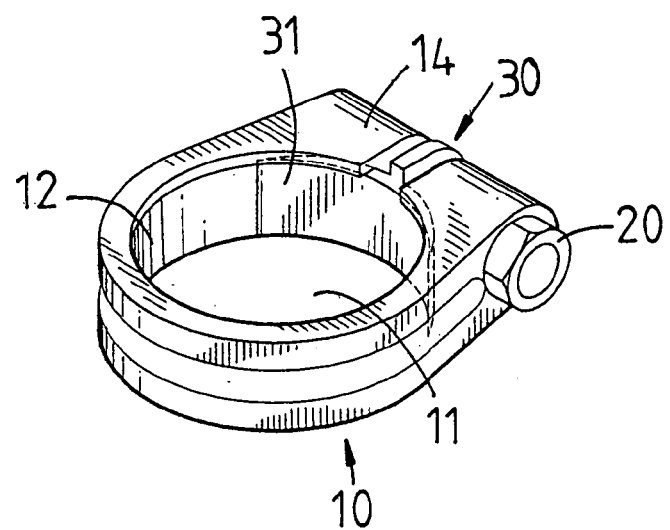
FIG. 2 is an assembled view of the tube retainer of the present invention.
Figure 3:
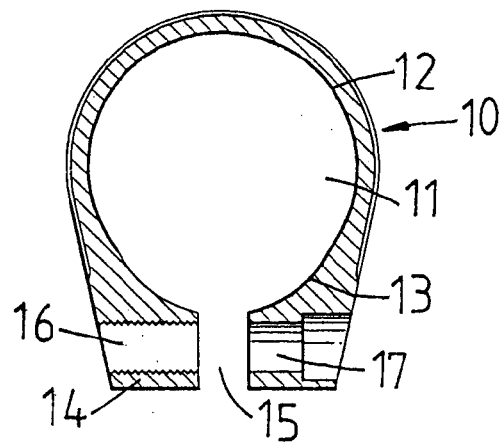
FIGS. 3 to 5 are cross section views showing the assembly of the tube retainer of the present invention.
Figure 5:
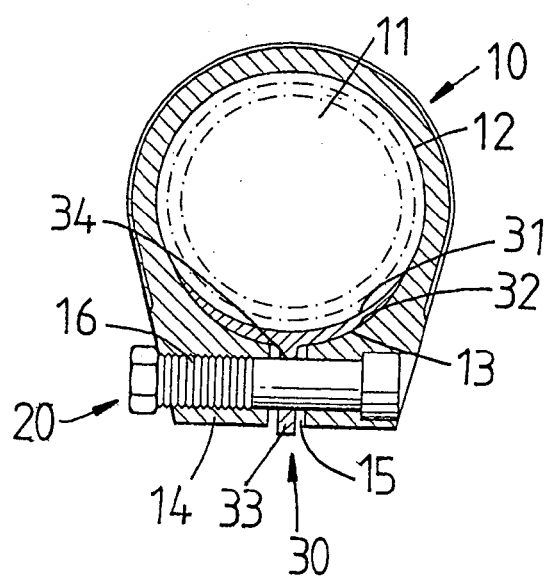

The tube retainer of the present invention is illustrated in FIGS. 1 to 3. The tube retainer includes a tube body 10. A center of the tube body 10 is formed with a receiving space 11. The receiving space 11 is formed by a large cambered surface 13 and a small cambered surface 12 (referring to FIG. 3). One end of the tube body 10 is formed with a tightening portion 14. The tightening portion 14 is formed with a slot 15 communicated with the receiving space 11 and the outside. A threaded hole 16 is formed in the tightening portion 14 and vertical to one side of the through the slot 15 and a via hole 17 is formed in the tightening portion 14 and vertical to another side of the slot 15. A screw fastener 20 serves to tighten the tube body 10.

A pad 30 has a cambered shape like a crescent moon. The inner cambered surface 31 has the same radian as that of the small cambered surface 12 and the outer cambered surface 32 has the same radian as that of the large cambered surface 13. A protrusion 33 protrudes from the outer cambered surface 32. The protrusion 33 has a through hole 34 for retaining the screw fastener 20.

Figure 4:
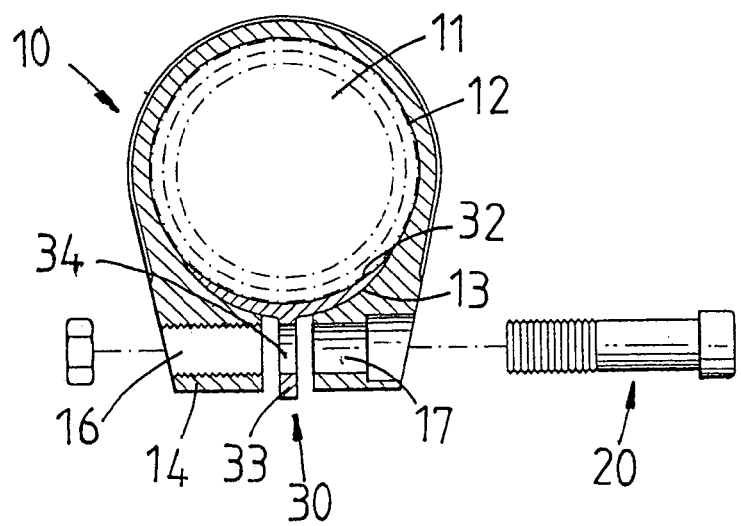
Figure 6:
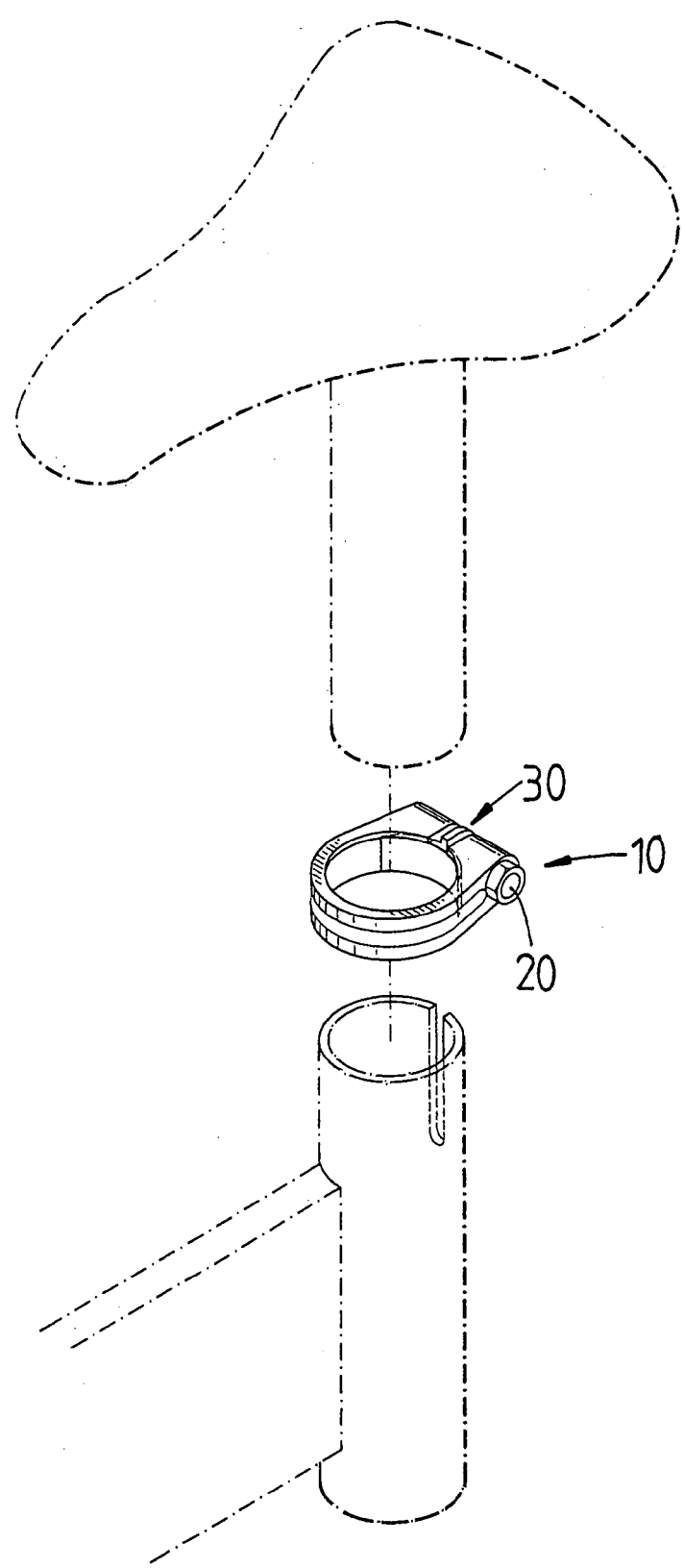
FIG. 6 shows one preferred embodiment of the tube retainer of the present invention.
Figure 7:
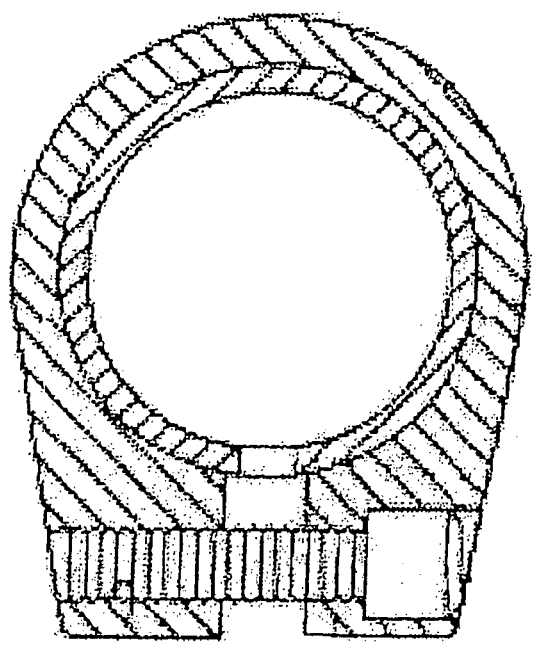
FIGS. 7 and 8 are cross section views of the prior art tube retainer.
Figure 8:
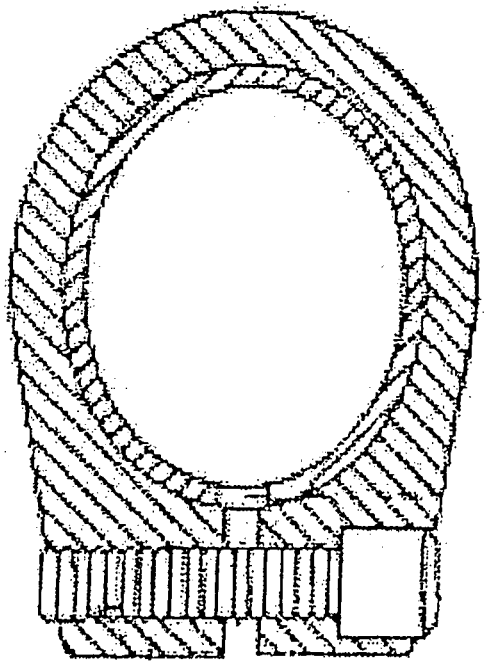

In use of the present invention, with reference to FIGS. 4 and 6, in locking, the pad 30 is placed in the slot 15. Then the screw fastener 20 passes through the via hole 17, through hole 34 and the threaded hole 16. At this time, the outer cambered surface 32 of the pad 30 will adhere to the large cambered surface 13 of the tube body 10 and the inner cambered surface 31 thereof is connected with the smaller cambered surface 12 so as to form a complete closed round surface.

As above said, the acting force in connection will distribute on the whole round surface, thereby, stress will not concentrate at some points. Thereby, no deformation occurs. The prior art tube will cause the screw fastener 20 retracts so that the tube retainer is deadly buckled. In the present invention, the adjustment of the tube position is easy.

Referring to FIG. 6, a preferred embodiment of embodiment is illustrated, where the tube retainer is used to a seat tube of a bicycle. In that, an inner side of the tube body 10 is installed with a large cambered surface 12 and a small cambered surface 13. A pad 30 is added to the tube body 10. The inner side and outer side of the pad 30 are formed with an inner cambered surface 31 and an outer cambered surface 32 corresponding to the small cambered surface 13 and large cambered surface 12. The pad 30 can fill the slot 15.

Thereby, a complete round surface is formed in the receiving space 11 so that stress can be uniformly distributed and is not concentrated in some points.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A tube retainer comprising
a tube body; a center of the tube body being formed with a receiving space; the receiving space being formed by a large cambered surface and a small cambered surface; one end of the tube body being formed with a tightening portion; the tightening portion being formed with a slot communicated with the receiving space and the outside of the tube body; a hole being formed in the tube body and the hole passing through the slot; and a pad having a cambered surface which has the same radian as that of the receiving space; a protrusion protruding from the outer cambered surface; the protrusion having a through hole for retaining a screw fastener.

2. The tube retainer as claimed in claim 1, wherein the receiving space has a large cambered surface and a small cambered surface.

3. The tube retainer as claimed in claim 1, wherein a threaded hole is formed in the tightening portion and at one side of the slot and a via hole is formed in the tightening portion and at another side of the slot.

4. The tube retainer as claimed in claim 2, wherein the small cambered surface is at the tightening portion and is adhered to the pad.

* * * * *